Figure 4:
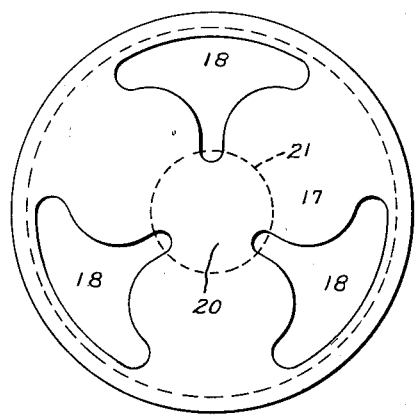

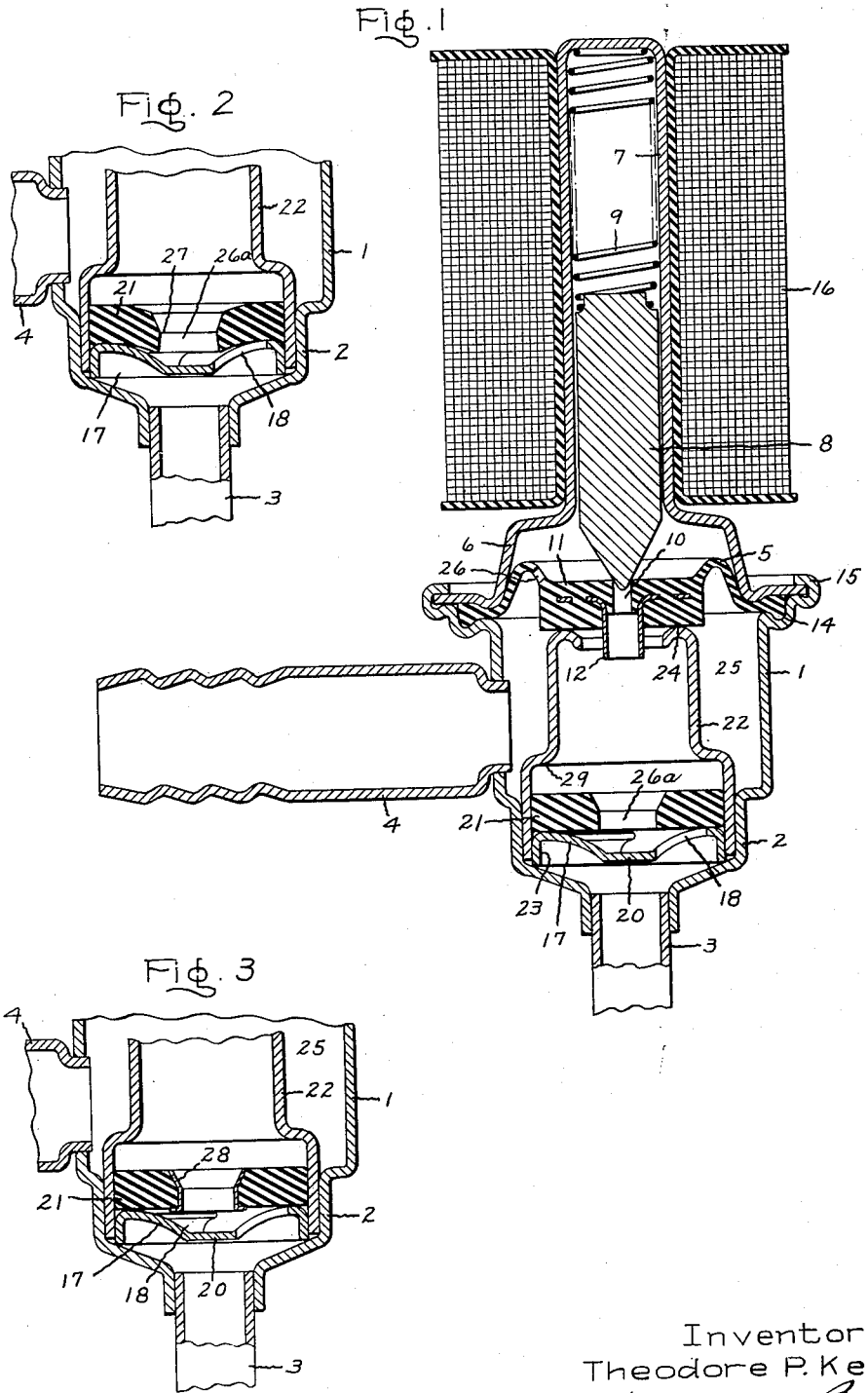

Feb. 23, 1954

T. P. KESSLER 2,670,010

MEANS FOR ESTABLISHING SUBSTANTIALLY UNIFORM
FLOW RATE IN CONDUITS AND THE LIKE

Filed May 26, 1950

2 Sheets-Sheet 2

Inventor
Theodore P. Kessler
by Sheridan W. Boggs
His Attorney

Patented Feb. 23, 1954

2,670,010

UNITED STATES PATENT OFFICE 2,670,010

MEANS FOR ESTABLISHING SUBSTANTIALLY UNIFORM FLOW RATE IN CONDUITS AND THE LIKE

Theodore P. Kessler, Burlington, N. J., assignor to General Electric Company, a corporation of New York Application May 26, 1950, Serial No. 164,371

5 Claims. (Cl. 138—43)

1

My invention relates to flow control devices for installation in a flow line to maintain a substantially uniform rate of flow therein under varying conditions of pressure drop in the line.

Among the objects of my invention are: to provide means for maintaining a substantially uniform rate of flow through a conduit in spite of upstream line pressure variations; to provide an improved annular flow control member of resilient material mounted in a flow line in association with an orifice plate to flex toward said plate in flow-throttling relationship in accordance with the magnitude of pressure drop thereacross; to provide a flow control orifice having means for adjusting the effective discharge area thereof, in a predetermined relationship to the pressure drop across the orifice; to provide a valve having a body construction which includes a discharge orifice and pressure responsive means for controlling the effective area of the orifice in a direct relationship to the pressure drop through the valve; and to provide an annular flow control member of resilient, flexible material, in which the effective diameter of the aperture thereof remains substantially constant during the flexing of the member.

A presently preferred form of my invention includes an orifice plate which is concave in an upstream direction, and having a plurality of orifices disposed radially outwardly of a center portion of relatively small area. In association with said plate at the upstream side thereof, I position an annular member of resilient, flexible, material mounted on the rim of said orifice plate so as to flex toward the cavity thereof to an extent roughly proportional to the pressure drop across the member. A relatively large unsupported area of the member overlies the orifices; and depending upon the amount of flexure of the member the orifice area will be reduced with resultant reduction in the flow capacity thereof. In this fashion, the increase in flow ordinarily accompanying increased pressure drop across an orifice may be controlled so as to maintain a substantial uniform rate of flow over a wide range of pressure differentials. The tendency to overcontrol which is present in conventional devices utilizing the flexure of a resilient annular body is minimized by establishing the orifice of the annular member in such fashion that its effective area will not be changed as a result of flexure of the member. In a presently preferred construction, I establish the minimum orifice area in the neutral plane of the annular member so that as the member flexes in accordance with the pressure differential thereacross, there will be no distortion of the orifice at the neutral plane.

Figure 5:
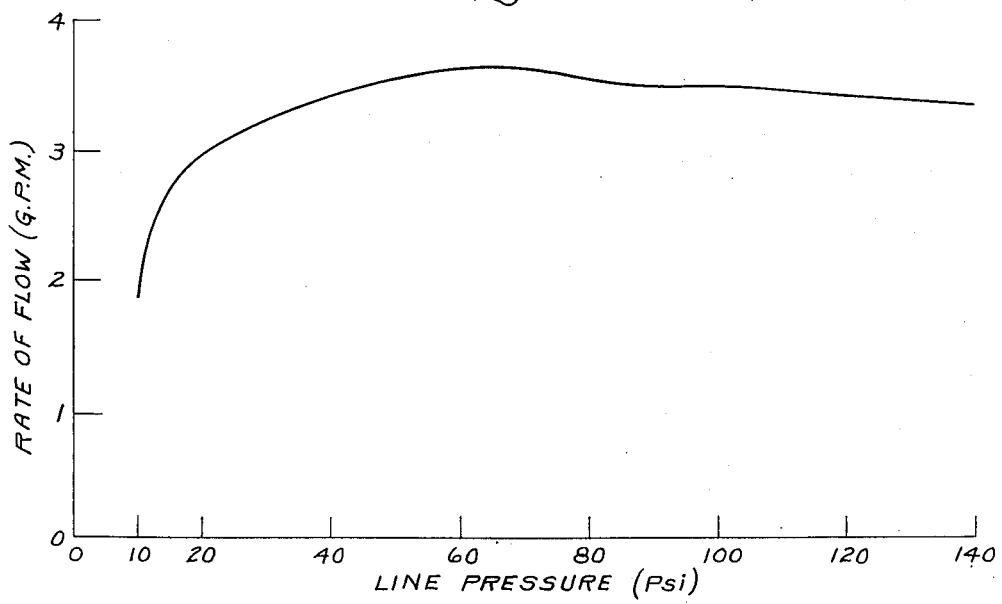

Other features and advantages will be apparent from the following detailed description of presently preferred embodiments of the invention, read in the light of the accompanying drawings in which Fig. 1 is a side elevation, in section, showing my invention embodied in a valve; Fig. 2 is a partial sectional elevation of the valve of Fig. 1 indicating the action of the flow control member during flow through the valve; Fig. 3 is a sectional elevation similar to Fig. 2 but showing a second form of flow control member in its relaxed state; Fig. 4 is a plan view of the orifice plate employed with the two embodiments of the device; and Fig. 5 is a performance curve predicated upon tests of the embodiment of Fig. 1 and showing rate of flow plotted against pounds per square inch inlet pressure.

As appears in Fig. 1, I have chosen to illustrate the invention in association with a valve of the solenoid actuated type, such as used in domestic washing machines. An example of a suitable valve of this type is shown and described in my copending application, Serial No. 164,404, filed concurrently herewith, for a Flow Control Device. However, it will be understood that I consider the valve body to be representative of any flow conduit within which my flow control system may be installed; and that the solenoid actuating means merely typifies any suitable means for operating a valve disk relative to a valve seat. In other words, I wish to emphasize that the actual environment of the flow control device embodying the invention is of relatively minor importance.

In Fig. 1, the relatively large diameter valve body 1 has a reduced diameter portion 2 terminating in an outlet to which a discharge line 3 may be suitably affixed. The body wall is pierced to accommodate the inlet connection 4 which may be secured to the body by soldering, brazing or other conventional means. The upper portion of the valve body provides a rim for the support of a valve disk diaphragm 5 and for the attachment of a cap 6 having a closed ended sleeve 7 concentric with the diaphragm member and serving to house and guide the magnetic plunger 8. Said plunger is biased by spring 9 to seat against the aperture 10 of the valve disk 11. Preferably said disk is integral with the diaphragm portion 5. The valve disk and diaphragm may advantageously be molded from rubber—by which term is meant to include natural and synthetic rubbers and rubber-like compositions—and the disk may have a metallic eyelet 12 of which the upper flange portion provides for reinforcement of the disk. The rim 14 of the valve diaphragm portion is thickened so as to be compressed to provide a leak-proof joint as the flange of the cap 6 is secured against the upper portion of body 1 by beading or rolling over the edge 15 of said body. For moderate line pressures the joint between the valve body and valve cap need not be brazed or soldered. A solenoid 16 of appropriate design is carried on the sleeve 7 and serves when energized to draw the armature 8 upwardly against the bias of spring 9. The electrical characteristics of said solenoid are preferably such that it will operate satisfactorily on a line voltage substantially less than the usual 110 volt domestic wiring installation. For example, the solenoid should be able to pull the armature away from aperture 10 at 95 volts when a pressure of 150 p. s. i. exists in the line, to accommodate the frequently experienced sub-normal voltages in house wiring systems.

The flow control device comprises a concave plate 17 having a plurality of orifices 18 arranged radially outward of a preferably solid center portion 20 (see Fig. 4) and in association therewith, a flexible annular control member 21 supported about its periphery on the outer shoulder portion of plate 17. As appears in Fig. 1 the concave portion of plate 17 faces in an upstream direction; it will also be observed that the wall portions of the plate between the center portion and the rim are convex in an upstream direction. When employed in association with a valve body, it is advantageous to mount the orifice plate and diaphragm combination in a tubular housing 22 which provides a valve seat structure. Said housing is expanded in its lower portion to fit snugly within the reduced diameter area 2 of the valve body. In turn, the wall 23 of the orifice plate 17 fits tightly in contact with the inner wall of said housing 22, as does the member 21. The upper portion of housing 22 provides a valve seat 24 for cooperation with the valve disk element 11. By reducing the diameter of the upper portion of housing 22, said housing portion forms a baffle which establishes a relatively large annular chamber 25 through which the incoming water flows to exert pressure against the underside of the diaphragm 5. The valve disk 11 is protected against sideward displacement under the pressure of incoming fluid by its position well above the inlet 4 and the baffle effect of the housing 22. It will be noted that diaphragm 5 has a port 26 of substantially less diameter than port 10. This is conventional in valves of the diaphragm-disk type. When the valve is closed the total pressure above the diaphragm is greater than that beneath; when plunger 8 is retracted, liquid escapes through port 10 faster than it can be built up through port 26, and the pressure increase on the underside of the diaphragm causes the disk to raise from the seat. Fig. 2 shows the action of the flow control unit under typical operating conditions. It will be assumed that the solenoid has withdrawn the plunger 8 permitting the valve disk 11 to be unseated and that the back pressure in conduit 3 is substantially less than the inlet pressure. This is the normal operating condition. The unsupported center portion of annular member 21 deflects in the direction of water flow and folds downwardly against the convexly curving wall portion of plate 17 to restrict the orifices 18. The center portion 20 of plate 17 which is disposed immediately beneath an orifice 26a in the annular member 21 influences a major portion of the liquid to flow radially through the orifices. The resulting forces exerted against the underside of the control member supports the same against over-deflection and resultant tendency to overcontrol. A feature of my invention which also stabilizes flow through the control member is the provision for holding the effective diameter of orifice 26a substantially uniform over the full range of deflection of the member. In the embodiment of Figs. 1 and 2, I establish the diameter of the orifice at the neutral plane 27 of the relatively thick control member. By suitably chamfering the orifice above the neutral plane, the compression of the upper portion of the member will not reduce the orifice to less than that at the neutral plane nor will the flaring of the orifice at the lower wall have any substantial effect on flow through the member. In the embodiment of Fig. 3 I provide the control member with a metallic eyelet 28 which, of course, will not change in diameter or flow characteristic regardless of deflection of the member.

The cloverleaf shape of the orifices 18 shown in Fig. 4 has proven very satisfactory in operation. The wide base areas of the orifices are the first to be closed under flow conditions. The small neck portions of the orifices toward the center of the plate will be only partly closed at the upper limits of usual operating pressures. Fig. 4 shows in dotted line the maximum possible extent of encroachment of member 21 on the orifices 18. It will be observed that the innermost tips of the orifices remain open thus providing an escape from the valve and insuring against the generation of bursting pressures within the valve body or conduit.

The curve of Fig. 5 shows the rate of flow through the control device when assembled in the type of valve shown in Fig. 1. The control member 21 was molded from a rubber composition of 50 durometer hardness. The valve was arranged in a horizontal position for discharge to atmosphere. It will be seen that at about 40 pounds/sq. inch pressure—which is the usual average water pressure in domestic plumbing systems—the flow rate is slightly below 3.5 gallons per minute and that in the 40 to 80 lb. pressure range the flow rate is consistently of the order of 3.5 gallons per minute. The standards set up for testing the flow control unit in a typical application require a flow rate of from 2.5 to 3 gallons per minute at 20 p. s. i. pressure and from 3 to 3.5 gallons per minute throughout a pressure range of from 40 to 150 p. s. i. pressure. These standards are successfully met. The consistency of flow rate resulting from the use of the invention adapts it particularly well to installations in which it would be uneconomic to place a pressure regulator in the supply line. For example, my flow control unit is particularly suitable for use in automatic washing machines because at little expense it provides for a substantially uniform rate of fill for the machine despite the variations in line pressure which are frequently experienced in domestic water systems.

Regardless of whether the flow control unit is placed in a horizontal or a vertical line, the control member 21 is held by the shoulder 29 against extreme displacement. I contemplate that after long periods of use the member 21 may no longer fit snugly within the housing 22 and, therefore, I provide the shoulder 29 to limit any angular displacement of the member 21 with respect to the axis of the conduit. The length of wall 23 of plate 17 prevents canting of the plate within housing 22.

The member 21 and the plate 17 need not, of course, be contained within a housing, although such combination simplifies its installation within a valve body. The invention may be installed in any straight run conduit, with or without a housing member. When used with a housing, it is, of course, obvious that the entrance and exit ports thereof must be suitably larger than the effective diameter of the aperture 26a. When installed without a housing, the outer diameter of wall 23 and member 21 will be appropriately sized for frictional fit within the conduit.

While I have shown particular embodiments of my invention, it will be understood, of course, that I do not wish to be limited thereto since many modifications may be made; and I therefore contemplate by the appended claims to cover any such modifications as fall within the true spirit and scope of the invention.

What I claim as new and desire to secure by Letters Patent of the United States is:

1. A flow control device for insertion in a conduit transversely thereof comprising, in combination, a dished plate having a center portion of small area relative to the total plate area and wall means extending convexly upwardly and outwardly therefrom to the rim of the plate, said wall means having orifices disposed between the center portion and said rim and increasing in area towards said rim; a flat, annular, member of resilient material engaging with the rim of said plate, said member being of substantial thickness and having an aperture coaxial with and substantially of the diameter of said plate center area whereby a relatively large area of said resilient member overlies said orifices for deflection relative thereto according to the magnitude of pressure drop across said member, the minimum diameter of said aperture being in the neutral plane of said member; and means for supporting said plate and said annular member in engagement with an inner wall of said conduit with the dished portion of said plate facing upstream.

2. A flow control device comprising, in combination, a rigid concave plate having a substantially imperforate center portion of small area relative to the total plate area and wall means extending convexly and outwardly therefrom to a flat annular rim, said wall means having orifices therethrough, the portion of said orifices adjacent said plate rim being of large area relative to the portion adjacent said plate center portion; a flat, annular, member of resilient and deformable material on the upstream side of said plate supported on said rim, said annular member having a central aperture coaxial with and substantially of the diameter of said plate center area, whereby without flow induced stress a substantial area of said resilient member overhangs said orifices in spaced relation therewith; and means for mounting said plate and annular member within a flow conduit to extend transversely thereacross with the dished portion of said plate facing upstream, said mounting means having an inlet and an outlet at least as great in area as the aperture area of the resilient member.

3. A flow control device for insertion in a conduit comprising, in combination, a dished plate having a flat center portion of small area relative to the total plate area and wall means extending convexly therefrom to the rim of the plate, said wall means having orifices disposed between said center portion and said rim; a relatively thick, annular, member of resilient material having an aperture therein supported upon the rim of said plate, the aperture in said member being coaxial with and substantially of the diameter of said center plate whereby a substantial area of said resilient member overlies said orifices in spaced relation therewith for flexing relative to said orifices according to the pressure drop across said member; means for maintaining a uniform minimum area of said aperture during the flexing of said member; and means for securing said plate and annular member within a flow conduit to extend transversely thereacross with the dished portion of said plate facing upstream.

4. A flow control device for insertion in a conduit transversely thereof, comprising, in combination, a rigid concave plate facing in the upstream direction and having an imperforate center portion of small area relative to the total plate area and wall means extending outwardly and convexly therefrom to a flat annular rim of the plate, said wall means having orifices therethrough, and a flat, annular, member of resilient and deformable material on the upstream side of and supported on the rim of said plate, said annular member having an aperture therein coaxial with and substantially of the diameter of said plate center, whereby a substantial area of said resilient member overlies said orifices in spaced relation therewith in the absence of flow induced stress; said plate having a peripheral wall extending in the direction of flow from said rim a substantial depth for supporting said plate by engagement with the inner wall of said conduit, and said annular member having a relatively thick peripheral wall for frictional engagement with said conduit inner wall.

5. A flow control device comprising in combination a concave plate having orifices disposed radially outward of the center thereof, said orifices increasing in area toward the outer margin of said plate, an annular member of resilient material having an aperture therein supported on the concave side of said plate at the periphery thereof, the aperture of said annular member being small relative to the diameter thereof to provide a relatively large unsupported area above said orifices and means for supporting said plate and said annular member transversely within a conduit with the concave side of the plate facing upstream, whereby said member will deflect toward said plate in proportion to the pressure drop thereacross, the aperture area of said annular member affording communication with portions of said orifices under maximum possible deflection of said member.

THEODORE P. KESSLER.

References Cited in the file of this patent
UNITED STATES PATENTS

| Number | Name | Date |
|---|---|---|
| 1,154,962 | Bayles | Sept. 28, 1915 |
| 2,454,929 | Kempton | Nov. 30, 1948 |
| 2,489,542 | Rosenblum | Nov. 29, 1949 |
| 2,489,932 | Rosenblum | Nov. 29, 1949 |
| 2,500,750 | Halenza | Mar. 14, 1950 |
| 2,503,901 | Chase | Apr. 11, 1950 |
| 2,593,315 | Kraft | Apr. 15, 1952 |